United States Patent
Greis

(10) Patent No.: US 8,036,111 B2
(45) Date of Patent: Oct. 11, 2011

(54) CONNECTION SET-UP IN A COMMUNICATION SYSTEM

(75) Inventor: Marc Greis, Irving, TX (US)

(73) Assignee: Nokia Corporation, Espoo (FI)

( * ) Notice: Subject to any disclaimer, the term of this patent is extended or adjusted under 35 U.S.C. 154(b) by 2190 days.

(21) Appl. No.: 10/398,717

(22) PCT Filed: Oct. 8, 2001

(86) PCT No.: PCT/EP01/11564
§ 371 (c)(1), (2), (4) Date: Sep. 15, 2003

(87) PCT Pub. No.: WO02/32167
PCT Pub. Date: Apr. 18, 2002

(65) Prior Publication Data
US 2004/0028034 A1    Feb. 12, 2004

(30) Foreign Application Priority Data
Oct. 9, 2000 (GB) ................... 0024694.2

(51) Int. Cl.
*H04J 1/16* (2006.01)
(52) U.S. Cl. ................... 370/230; 370/338
(58) Field of Classification Search ........... 370/231, 370/332, 335, 338, 349, 437, 465, 468, 230.235, 370/348, 434, 450, 451; 455/434, 450, 451
See application file for complete search history.

(56) References Cited

U.S. PATENT DOCUMENTS

| | | | |
|---|---|---|---|
| 5,953,346 A * | 9/1999 | Luddy | 370/465 |
| 6,070,192 A * | 5/2000 | Holt et al. | 709/227 |
| 6,104,929 A * | 8/2000 | Josse et al. | 455/445 |
| 6,347,091 B1 * | 2/2002 | Wallentin et al. | 370/437 |
| 6,654,610 B1 * | 11/2003 | Chen et al. | 455/450 |
| 6,937,566 B1 * | 8/2005 | Forslow | 370/231 |
| 2002/0114305 A1 * | 8/2002 | Oyama et al. | 370/338 |

FOREIGN PATENT DOCUMENTS

| | | |
|---|---|---|
| JP | 2006-320003 | 11/2006 |
| WO | WO 97/12490 | 4/1997 |
| WO | WO 97/26739 | 7/1997 |
| WO | WO 99/52307 | 10/1999 |
| WO | 00/08812 | 2/2000 |
| WO | WO 00/38369 | 6/2000 |

\* cited by examiner

*Primary Examiner* — Chi Pham
*Assistant Examiner* — Alexander Boakye
(74) *Attorney, Agent, or Firm* — Mintz, Levin, Cohn, Ferris, Glovsky and Popeo, P.C.

(57) ABSTRACT

In a communication system a procedure is initiated to establish a communication connection for a user equipment. A data bearer may be established via one or more nodes of the communication system for the user equipment before the communication connection procedure is completed. An instruction is signalled to at least one of the nodes associated with the data bearer to prevent transportation of data to or from the user equipment using the data bearer. Based on the instruction, transportation of data to or from the user equipment is prevented until the communication connection establishment procedure has been completed. According to a further aspect, an indication is signalled to at least one of the nodes that the communication connection establishment procedure is completed. Charging record unit associated with charging of data transportation prior said completion are closed in response to the signal.

46 Claims, 2 Drawing Sheets

CONNECTION SET-UP IN A COMMUNICATION SYSTEM

FIELD OF THE INVENTION

The present invention relates to connection set-up procedures, and in particular, but not exclusively, to call set-up in a communication system capable of transporting data packets.

BACKGROUND OF THE INVENTION

Different communication networks are known. Communication networks typically operate in accordance with a given standard or specification which sets out what the various elements of the network are permitted to do and how that should be achieved. For example, the standard or specification may define whether the user, or more precisely, user equipment or terminal is provided with circuit switched or packet switched service. The standard or specification may also define the communication protocols and/or parameters which shall be used for the connection. In other words, the standards and/or specifications define the "rules" on which the communication within a communication system can be based on. Examples of the different standards and/or specifications include, without limiting to these, specifications such as GSM (Global System for Mobile communications) or various GSM based systems (such as GPRS: General Packet Radio Service), AMPS (American Mobile Phone System), DAMPS (Digital AMPS), WCDMA (Wideband Code Division Multiple Access) or $3^{rd}$ generation UMTS (Universal Mobile Telecommunications System), IMT 2000 (International Mobile Telecommunications 2000) and so on.

In a cellular communication system a base station serves mobile stations or other user equipment (UE) via a wireless interface. Each of the cells of the cellular system can be served by an appropriate transceiver apparatus. The wireless communication may be controlled by an appropriate radio access network controller. The access network controller may be connected to and controlled by another controller facility that is typically in the core network side of the communication system. An example of the core network controller is a serving GPRS support node (SGSN). The controller may be interconnected and there may be one or more gateway nodes for connecting the cellular network to other communication networks. For example, the SGSN may be connected to a Gateway GPRS support node (GGSN) for connecting the mobile network to the Internet and/or other packet switched networks.

In addition to transmitting data, the third generation telecommunication systems such as the UMTS enable also voice transmission over the packet data connection, for example Voice over Internet Protocol (VoIP) calls. So called PDP contexts can be used for the Internet Protocol (IP) based telephony. The term 'PDP context' typically refers to the part of the data connection or data bearer that goes through the packet switched network (e.g. the GPRS/UMTS network). The PDP context can be seen as a logical connection or "pipe" from the wireless station to the access point of a gateway node, such as the GGSN, the access point being the connection point between the packet switched network (e.g. GPRS/UMTS mobile network) and an external data network. The PDP context may also be referred to, instead of the term logical connection, as a logical association between the access point and the user equipment (UE).

For example, in a Session Initiation Protocol (SIP) call set-up in the $3^{rd}$ generation UMTS networks, a Packet Data Protocol (PDP) context will have to be established before the actual call is established (i.e. before the phone starts alerting the user thereof) to ensure that necessary resources for the connection are available. However, the inventor has found that the reserved data bearer resources may enable transmission of data on the PDP context while the phone is still alerting the user thereof. This may occur e.g. since a PDP context can be set up without restricting the use thereof in any way. Thus the user may be able to have a full voice call or other data transmission already during the alerting time. This may be disadvantageous, at least from the operators pint of view, as the alerting or ringing time is usually not charged from the caller or receiver of a call. Therefore it could be advantageous to have a possibility to either prevent the user from sending data before the call is established or at least to be able to detect and gather information regarding data transmission during the call set-up proceedings so that it is possible later on to determine whether any charges have incurred during the call establishment proceedings.

Instead of enabling this, the current call establishment procedures are adapted to optimise usage of resources. A possibility could be to proceed the call set-up procedure such that no radio bearer is established before the call set-up is completed. Another possibility could be that although the resources on the radio bearer may be pre-reserved, the resources cannot be used for data transmission until the connection set-up is completed.

However, these possibilities may have some drawbacks. One of the possible drawbacks is long post-pickup delay. The radio bearer has to be either modified or established after the incoming call is answered e.g. by picking the phone up. Furthermore, it may be that ring-back tone cannot be played by the network. If no radio bearer is established on the side of the calling party while the phone alerts, then it may not be possible for the network to play the ring-back tone (as is currently the case e.g. in a GSM system). This means that the ring-back tone would have to be generated by the phone itself. This may prevent the network from using any network-specific ring-back tones. In addition, announcements cannot typically be played without prior establishment of the radio bearer. If an announcement has to be played by the network, it is typically necessary to establish/modify the radio bearer first. The simplest and most usual case where this applies is the busy signal, but there are many other announcements which may be sent between the phone and the network.

Not all wireless data communication system enable "pre-reservation" of resources on the radio bearer. If the radio resources are not reserved or at least "pre-reserved" before the call is established, then it is possible that the user attempts to answer the call e.g. by picking up the phone, and then, if the attempt to establish the radio bearer fails, the call is dropped. This is a situation that should be avoided.

SUMMARY OF THE INVENTION

Embodiments of the present invention aim to address one or several of the above problems.

According to one aspect of the present invention, there is provided a method in a communication system, the method comprising: initiating a procedure for establishing a communication connection for a user equipment; establishing a data bearer for the user equipment; signalling an instruction to at least one node associated with the data bearer to prevent transportation of data to or from the user equipment by means of the data bearer via said at least one node; and preventing transportation of data to or from the user equipment until said communication connection establishment procedure has been completed.

According to another aspect of the present invention there is provided a method in a communication system, comprising: initiating a procedure for establishing a communication connection for a user equipment; establishing a data bearer for the user equipment; signalling an indication that the communication connection establishment procedure is completed; and in response to receiving said indication in a node associated with the data bearer, closing charging record means associated with charging of data transportation on the data bearer prior said completion of the communication connection establishment procedure.

According to another aspect of the present invention there is provided an arrangement in a communication system, said communication system providing communication services for user equipment, the arrangement comprising: control means for initiating a procedure for establishing a communication connection for a user equipment via the communication system; a data bearer established for the user equipment via at least one node of the communication system; control means for generating and signalling an instruction to at least one node associated with the data bearer, the instruction being adapted to indicate that transportation of data to or from the user equipment by means of the data bearer is to be prevented; and wherein said at least one node associated with the data bearer is arranged to prevent transportation of data to or from the user equipment in response to said instruction signal.

The embodiments of the invention may provide a solution for detecting and/or avoiding improper usage of data bearers during call set-up procedures. The embodiments may be especially useful in connection with calls to be transported over a packet data communication media. The embodiments may be used to ensure that resources are available already during the alerting stage. The embodiment may assist in providing a substantially short delay after an incoming call has been picked up i.e. answered. The network may be enabled to play announcements that associate with an incoming communication.

BRIEF DESCRIPTION OF DRAWINGS

For better understanding of the present invention, reference will now be made by way of example to the accompanying drawings in which.

DESCRIPTION OF PREFERRED
EMBODIMENTS OF THE INVENTION

Figure 1:
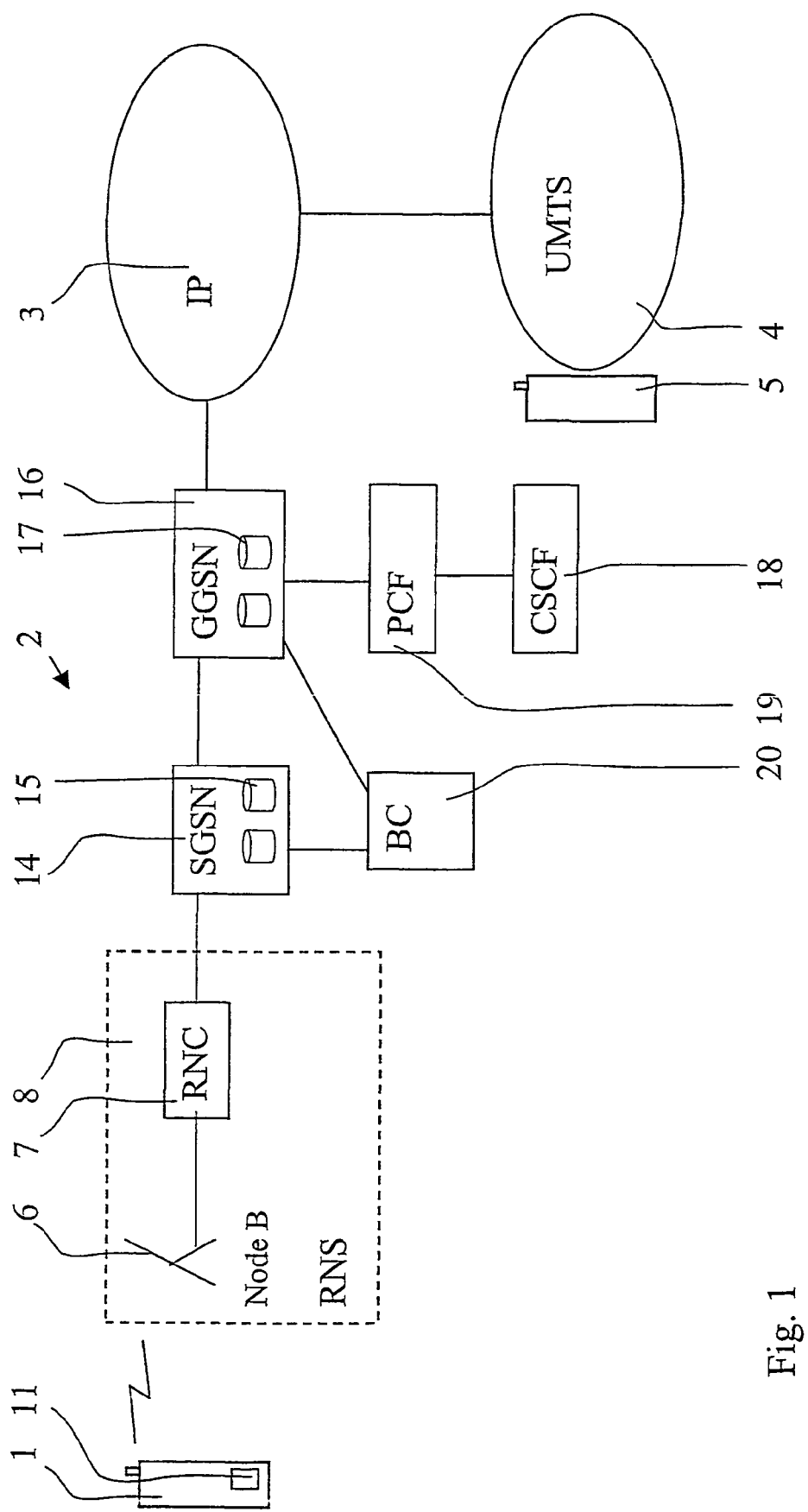
FIG. 1 shows a communication system wherein the embodiments of the present invention may be employed.

Reference is made to FIG. 1 which shows a communication system in which the embodiments of the present invention may be employed. More particularly, FIG. 1 shows some of the elements of a Universal Mobile Telecommunication Services (UMTS) system.

Each cell (not shown) of the UMTS has associated therewith a base station 6. Depending on the standard being used by the network, the base station is sometimes referred to as node B, for example in the third generation standards. The term base station will be used in this document to encompass all transceiver elements which are enabled to communicate with a mobile station 1 or similar user equipment (UE) via the air interface. The mobile station 1 may be associated with a processor element 11 for the implementation of control operation required in some embodiments, as will be explained later.

The base station 6 is controlled by a radio network controller RNC 7. The radio network controller RNC and the base station may sometimes be referred to as the radio network subsystem RNS 8 or radio access network RAN. It should be appreciated that a UMTS network is typically provided with more than one RNC, and that each radio network controller is arranged generally to control more than one base station 6 although only one base station is shown in FIG. 1. The elements of the RNS can be included in either or both of the RNC and the base station. This is an implementation issue.

The radio network subsystem 8 may be connected to a SGSN (serving GPRS support node) 14. The SGSN 14 keeps track of the mobile station's location and performs security functions and access control and other possible control operations. The functions of the SGSN are defined more precisely e.g. in the 3GPP specification 23.060. The SGSN 14 is connected to a GGSN (gateway GPRS support node) 16. The GGSN 16 provides interworking with external packet switched networks, i.e. the GGSN acts as a gateway between the UMTS data network 2 and an external network 3, such as an IP based data network. The functions of a typical GGSN are also defined in the above referenced 3GPP specification.

FIG. 1 shows further a second UMTS network 4. The second UMTS network may be of a substantially similar design than the first UMTS network 2. The second UMTS network 4 serves a second user equipment 5. However, it should be appreciated that a communication connection may as well be established between the user equipment 1 and another node connected to the first UMTS network 2, e.g. between the two mobile stations in communication with the base stations of the network 2.

Although not shown, the network system 2 may also be connected to conventional telecommunication networks, such as to a GSM based cellular public land mobile network (PLMN) or to a public switched telephone network (PSTN). The various networks may be interconnected to each other via appropriate interfaces and/or gateways.

Figure 2:
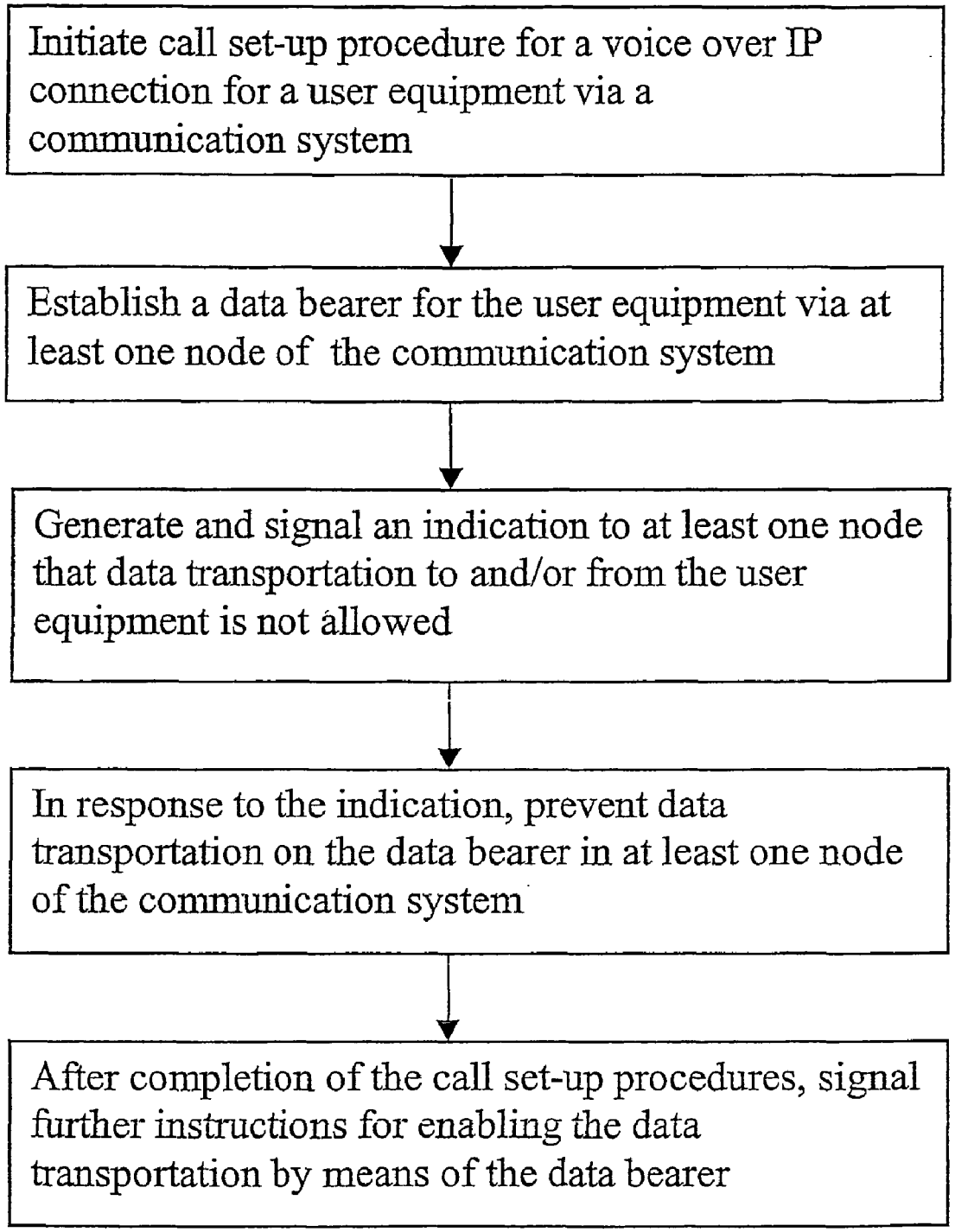
FIG. 2 is a flowchart illustrating the operation of one embodiment of the present invention.

The following describes with reference to FIGS. 1 and 2 embodiments that enable prevention of unauthorised or improper data transmission to and/or from the user equipment 1 on a data bearer over a wireless interface. In accordance with the second aspect, some of the embodiments enable detection of data transmission on the data bearer during the call connection establishment procedures so that it is possible to determine the nature of the data transmitted over the wireless interface. The described methods can be used either separately or in conjunction with each other. The first embodiment may be used to prevent fraudulent or otherwise unauthorised usage of data bearers. The second method allows the detection of unauthorised usage of data bearers so that it can be charged later on, if this is deemed necessary.

The following examples assume that a PDP context with a full radio bearer is set up during a call set-up procedure. The following will discuss different possibilities how the user can be prevented from sending data on this PDP context before the call connection is fully established.

According to a possibility an appropriate indicator, such as flag, can be set on the PDP context, said indicator instructing the network elements (such as the RNC 7, SGSN 14, GGSN 16, or any subset of these elements) to drop all data packets which traverse this PDP context. In herein "data packets traversing a PDP context" refers to those data packets which have been classified into this PDP context by a data packet classifier (not shown). The classification of the data packets may have been accomplished according to so called Traffic Flow Template (TFT) filtering mechanism. The data packets may experience a quality of service (QoS) associated with it. The PDP context can be imagined as a "data pipe" with a certain size, the size representing the QoS. The distribution of the packets into different pipes is based on the TFT parameters. Thus data packets "traversing" a PDP context can be understood as those data packets which go through this "data pipe" associated with the particular PDP context.

The instruction indicator can be set e.g. by the Call State Control Function (CSCF) 18 by signalling to the GGSN through a Policy Control Function (PCF) 19. The "Policy Control Function" of a communication network is typically connected both to the CSCF and the gateway node, thus enabling communication between both of these elements. Other connections may also be provided, but they are not shown for clarity purposes.

Alternatively the flag or other indicator may be set by the user equipment (UE) 1. The procedure for setting the instructive indicator on the PDP context may be controlled by the processor 11. In this embodiment some applications may require that the presence of the flag or other indicator is to be enforced by the CSCF 18 through the PCF 19. The instruction needs to be removed later when the call is established either based on further instructions from the CSCF/PCF or by a PDP context modification procedure or some other procedure to ensure that the data packets are not dropped after the completion of the voice call establishment procedure.

The above embodiment has the advantage that data packets coming from the user equipment UE 1 may already be dropped at the radio network controller (RNC) 7 and the packets do not travel through the whole network before being dropped at the gateway node 16. However, this option may require additional signalling to the SGSN 14 and RNC 7 to remove the flag later. Therefore, a preferred option is to drop the data packets at the gateway node 16.

According to another possibility at least one of the nodes ion the data bearer are instructed by means of a Traffic Flow Template (TFT). The instructions may be given by means of the Traffic Flow Template (TFT) parameters both for the downlink and uplink direction. The instruction may be given by setting a parameter of the TFT in the PDP context to a value that does not allow for sending data packets. The TFT can be defined as a set of filters which contain information about the data packets which are expected for each PDP context. The information may be e.g. source/destination port numbers, protocol number, IPv6 flow label and so on. The TFT allows the nodes such as the GGSN to classify the incoming packets into a proper PDP context. Packets which do not match a TFT are discarded. An example of a TFT value that may be used herein is a non-existent IP address. An example of such address is '0.0.0.0'. Another possibility is to use the IP addresses of the gateway node's own interfaces. All data packets which do not match a TFT are dropped in the GGSN. If a non-existing IP address is used, all data packets to this address would be dropped.

An example for a packet filter associated to a PDP context is:

| | |
|---|---|
| Source address: | 100.101.102.103 |
| Source port: | 12345 |
| Destination port: | 23456 |

That means that all packets coming from that source address with these port numbers in the header would go into the associated PDP context and receive the QoS which is associated with this PDP context.

The TFT value may be set by the CSCF/PCF. The TFT value may alternatively be set by the user equipment (UE) 1 and enforced by the CSCF/PCF. The TFT value would have to be changed later when the call is established. The change of the value may be controlled by the CSCF/PCF or by a PDP context modification procedure.

This embodiment has an advantage in that it is possible to modify the TFT very quickly at the gateway node 16 by the CSCF/PCF, e.g. if it is necessary to play an announcement. The communication network may be provided with a server which is arranged to play tones and announcements to the mobile stations. It is possible that the downlink TFT can indicate this server from the moment the PDP context is established. The server may have an IP address. This IP address could be used as source address in the TFT for the downlink direction.

In the preferred embodiment signalling is required only to the gateway node 16 to modify the TFT, although in some application it may be necessary to modify the TFT in the user equipment (UE) 1 as well. However, it is possible that the user equipment 1 remains unaware of this procedure accomplished in the gateway node 16.

The above embodiment are directed against improper or fraudulent use of the data transmission capacity during the call establishment procedures. The following will discuss embodiments that do not stop such a use, but by means of which it is possible to detect such a use and bill, if necessary the user of the use of the data transmission resources. It is also possible to stop only a portion of the unauthorised use while allowing predetermined type of data or predetermined amount of data to be transmitted over the data bearer.

According to an embodiment the gateway node GGSN 16 and core network controller SGSN 14 create charging records 17 and 16, respectively, for PDP contexts. The charging records may contain required charging information such as timestamps and octet counts. The information collected in these records is transmitted to a billing center (BC) 20.

Based on the charging records the network operator is enabled to determine if the user was using a PDP context for sending data while the phone was in the alerting state e.g. ringing, vibrating or otherwise indicating an incoming call, by provision of clearly separated charging information regarding the alerting stage and the actual call state. In other words, information may be collected for the ringing time that is clearly separated from the actual charging information collected for the calling time. For this purpose, the charging records in GGSN and SGSN are "closed" when the call is established and new charging records are "opened" for the actual calling time.

This allows the operator to determine later on if the user has been sending data over this PDP context while the phone was alerting. This may be determined e.g. based on detecting that the uplink octet count for the ringing-time charging records is greater than zero or any other predetermined value, such as one. If announcements are played or a ringback tone is generated by the network, the octet count would be increased. However, the operator may distinguish announcements from actual abuse since that the announcements are typically sent only in downlink direction. In addition, the number of octets transferred for certain announcements (especially for ringback tones or busy signals) is typically known by the operator. It is also considered as unlikely that the bearer will be abused in the downlink direction while an announcement is being played.

Instead of a charging record for the duration of the pre-completion charging record and another charging record for the connection time, the charging (before and/or after the completion of the connection set-up) may be based on a set of charging records. This may be the case e.g. in the gateway node GGSN 16, since it may create charging records e.g. every 5 seconds.

The mechanism described above requires that the GGSN and SGSN are informed of the fact that the call was established by means of an appropriate indication so that they can appropriately handle the charging records. This information may be provided to the GGSN and SGSN e.g. by the user equipment (UE) or the call state control function (CSCF).

The UE may send a "Modify PDP Context Request" message with a flag or other indication that is set to indicate that all current charging records have to be closed. The CSCF may be arranged to send a notification to the GGSN to inform that the call has been established where after the gateway node may close its current charging record. The information can be passed on from the GGSN to the SGSN, although this is not always necessary. It may be enough to have the proper charging information in the GGSN. This would decrease the time needed for the procedure, especially when compared with the use of flags or other indicators in a message originated from the user equipment.

The user equipment originated call establishment indication may also require synchronisation between charging records of the call state control function 18 and the gateway node 16, if the call state control function also creates charging records indicating the time when a call connection was established. Otherwise it may be difficult later to determine if the user equipment 1 requested the PDP context modification at the right time. In the CSCF originated charging record closure and opening procedure the notification can be used for the synchronisation, and thus it is not necessary to provide any specific synchronisation procedures between these two functions.

The above described embodiments provide several advantages. For example, they enable minimum post-pickup delay after the call is answered. The embodiments allow fraud detection and/or fraud prevention. The embodiments may be used to ensure that resources are available when the user equipment alerts the user thereof. Ringback tone and other announcements can be played by the network elements. The embodiments can be easily implemented in the existing systems. In addition, the embodiments enable restrictions to the call charging so that data bearers may not be charged at predefined times, e.g. for the sending of call-set up related messages during call set-up proceedings.

It should be appreciated that whilst embodiments of the present invention have been described in relation to mobile stations, embodiments of the present invention are applicable to any other suitable type of user equipment.

The embodiment of the present invention has been described in the context of a UMTS system (Universal Mobile Telecommunications Service) and communications involving packet data. However, it should be appreciated that embodiments of the present invention are applicable to any other communication system which deals with data transmission on data bearers.

It is also noted herein that while the above describes exemplifying embodiments of the invention, there are several variations and modifications which may be made to the disclosed solution without departing from the scope of the present invention as defined in the appended claims.

The invention claimed is:

1. A method, comprising:
   initiating a communication connection establishment procedure for a user equipment;
   establishing a data bearer configured to transport packet data for the user equipment; and
   signaling, by at least one of a controller and a processor, an instruction to at least one node associated with the data bearer to prevent transportation of packet data to and from the user equipment using the established data bearer via said at least one node until said communication connection establishment procedure has been completed;
   wherein the instruction to the at least one node associated with the data bearer to prevent transportation of packet data causes the at least one node associated with the data bearer to drop at least some data packets transported by the data bearer via the at least one node until the communication connection procedure has been completed.

2. A method as claimed in claim 1, wherein at least one node associated with the data bearer is instructed to drop all data packets that are transported by the data bearer via said at least one node.

3. A method as claimed in claim 1, wherein at least one node associated with the data bearer is instructed to drop selected data packets that are transported by the data bearer via said at least one node.

4. A method as claimed in claim 1, wherein the instruction is signalled from the user equipment.

5. A method as claimed in claim 4, wherein the instruction is enforced by a call state control function of the communication system.

6. A method as claimed in claim 1, wherein the instruction is signalled from a call state control function of the communication system.

7. A method as claimed in claim 1, further comprising: signalling an indicator indicative of said instruction in a packet data protocol context associated with the data bearer.

8. A method as claimed in claim 7, wherein the indicator comprises a flag.

9. A method as claimed in claim 1, wherein the instruction comprises a filtering parameter for the data bearer, said filtering parameter being set such that all or selected data packets are filtered from the data bearer.

10. A method as claimed in claim 9, wherein the filtering parameter comprises a traffic flow template parameter.

11. A method as claimed in claim 9, wherein the filtering parameter is set by the user equipment.

12. A method as claimed in claim 9, wherein the filtering parameter is controlled by a call state control function of the communication system.

13. A method as claimed in claim 1, further comprising:
    signalling a further instruction to cancel said instruction to prevent the data transportation.

14. A method as claimed in claim 13, wherein the further instruction is signalled from the same source and using the same media as said instruction to prevent the data transportation.

15. A method as claimed in claim 1, wherein at least a part of the data bearer is established over a wireless interface between the user equipment and a transceiver node of the communication system.

16. A method as claimed in claim 1, wherein the prevention of transmission of data occurs at least in one of the following nodes of the communication system:
    a radio network controller, a core network controller, and a gateway.

17. A method as claimed in claim 1, wherein the communication system comprises a third generation cellular mobile communication network.

18. A method as claimed in claim 1, wherein the data bearer is established between the user equipment and a gateway node between two communication networks, said user equipment being in communication with one of the two networks.

19. A method as claimed in claim 1, wherein the communication connection is for voice communication over a packet data network.

20. A method as claimed in claim 1, further comprising:
determining if any data was transported on the established data bearer before completion of the communication connection establishment procedure.

21. A method as claimed in claim 20, wherein charging information associated with charges until the completion of the call establishment procedures is separated from charging information associated with the established communication connection.

22. A method as claimed in claim 21, wherein a first charging record or a first set of charging records is assigned for the charges until the completion of the call establishment procedures and a second charging record or a set of charging records is assigned for the charging information associated with the established communication connection, and wherein the first record or set of records is closed in response to a signal indicative of the completion of the call establishment procedure.

23. A method as claimed in claim 20, further comprising:
analyzing whether any chargeable data transmission occurred before the completion of the communication establishment procedure.

24. A method, comprising:
receiving, in a node associated with an established data bearer configured to transport packet data, an indication that a communication connection establishment procedure for a user equipment is completed;
in response to receiving said indication in the node associated with the data bearer, closing a charging record associated with charging of packet data transportation on the data bearer prior to said completion of the communication connection establishment procedure; and
dropping by the node associated with the established data bearer, prior to receiving the indication that the communication connection establishment procedure for the user equipment is completed, at least some data packets transported by the data bearer via the node.

25. A method as claimed in claim 24, further comprising:
opening of further charging record in response to receiving said indication, wherein said further charging record is configured to store information associated with charges after the establishment procedure has been completed.

26. A method as claimed in claim 25, wherein the charging record and the further charging record both comprise a set of records.

27. A method as claimed in claim 24, wherein the indication originates from the user equipment.

28. A method as claimed in claim 24, wherein the indication comprises a notification from a call state control function of the communication system.

29. A method as claimed in claim 24, further comprising:
analyzing whether any chargeable data transmission occurred on the data bearer before the completion of the communication establishment procedure.

30. A method as claimed in claim 24, wherein the indication is included in a message requesting modification of a packet data protocol context.

31. A method as claimed in claim 30, wherein the indication comprises a flag.

32. A method as claimed in claim 24, further comprising:
receiving, in at least one node associated with the data bearer, an instruction signal to prevent transportation of data to and from the user equipment using the data bearer via said at least one node; and
in response to the instruction signal, preventing transportation of data to and from the user equipment until said communication connection establishment procedure has been completed.

33. An apparatus, comprising:
a controller configured to initiate a communication connection establishment procedure for a user equipment via a communication system,
wherein the controller is configured to establish a data bearer configured to transport packet data for the user equipment via at least one node of the communication system, and
wherein the controller is configured to generate and signal an instruction to at least one node associated with the data bearer, the instruction configured to indicate that transportation of packet data to and from the user equipment using the established data bearer is to be prevented until said communication connection establishment procedure has been completed;
wherein the instruction to the at least one node associated with the data bearer to indicate that transportation of packet data to and from the user equipment using the established data bearer is to be prevented causes the at least one node associated with the data bearer to drop at least some data packets transported by the data bearer via the at least one node until the communication connection procedure has been completed.

34. An apparatus as claimed in claim 33, wherein the controller is configured to generate and signal a second instruction to enable the data transportation.

35. An apparatus, comprising:
initiating means for initiating a procedure for establishing a communication connection for a user equipment via the communication system;
establishing means for establishing a data bearer configured to transport packet data for the user equipment via at least one node of a communication system; and
controlling means for generating and signalling an instruction to at least one node associated with the data bearer, the instruction configured to indicate that transportation of packet data to and from the user equipment using the established data bearer is to be prevented until said communication connection establishment procedure has been completed;
wherein the instruction to the at least one node associated with the data bearer to prevent transportation of packet data causes the at least one node associated with the data bearer to drop at least some data packets transported by the data bearer via the at least one node until the communication connection procedure has been completed.

36. A method, comprising:
receiving, in at least one node associated with an established data bearer configured to transport packet data for a user equipment, an instruction signal to prevent transportation of packet data to and from the user equipment using the data bearer via said at least one node during a communication connection establishment procedure; and in response to the instruction signal, preventing transportation of data to and from the user equipment until the communication connection establishment procedure has been completed;

wherein preventing transportation of the data to and from the user equipment comprises dropping at least some data packets that are transported by the data bearer via said at least one node in response to the instruction signal until the communication connection procedure has been completed.

37. The method as claimed in claim 36, further comprising: in response to the instruction signal, dropping all data packets that are transported by the data bearer via said at least one node.

38. The method as claimed in claim 36, further comprising: in response to the instruction signal, dropping selected data packets that are transported by the data bearer via said at least one node.

39. An apparatus, comprising:
a receiver configured to receive, in at least one node associated with an established data bearer configured to transport packet data for a user equipment, an instruction signal to prevent transportation of packet data to and from the user equipment using the data bearer during a communication connection establishment procedure; and a controller configured to prevent transportation of data to and from the user equipment in response to said instruction signal until the communication connection establishment procedure has been completed;

wherein the controller configured to prevent transportation of the data to and from the user equipment in response to said instruction signal is configured to drop at least some data packets that are transported by the data bearer via said at least one node in response to the instruction signal.

40. The apparatus as claimed in claim 39, wherein the controller is configured to drop all data packets that are transported by the data bearer via said at least one node in response to the instruction signal.

41. The apparatus as claimed in claim 39, wherein the controller is configured to drop selected data packets that are transported by the data bearer via said at least one node in response to the instruction signal.

42. An apparatus, comprising:
a receiver configured to receive, in a node associated with an established data bearer configured to transport packet data, an indication that a communication connection establishment procedure for a user equipment is completed; and a controller configured to close a charging record associated with charging of packet data transportation on the established data bearer in response to receiving said indication in the node associated with the data bearer prior to said completion of the communication connection establishment procedure;

wherein the node is configured to drop, prior to receiving the indication that a communication connection establishment procedure for the user equipment is completed, at least some data packets transported by the data bearer via the node.

43. The apparatus as claimed in claim 42, wherein the controller is configured to open a further charging record in response to receiving said indication, wherein said further charging record is configured to store information associated with charges after the establishment procedure has been completed.

44. The apparatus as claimed in claim 42, wherein the controller is configured to analyze whether any chargeable data transmission occurred on the data bearer before the completion of the communication establishment procedure.

45. An apparatus, comprising:
receiving means for receiving, in a node associated with an established data bearer configured to transport packet data, an indication that a communication connection establishment procedure for a user equipment is completed; and controlling means for closing a charging record associated with charging of packet data transportation on the established data bearer in response to receiving said indication in the node associated with the data bearer prior to said completion of the communication connection establishment procedure;

wherein the node is configured to drop, prior to receiving the indication that a communication connection establishment procedure for the user equipment is completed, at least some data packets transported by the data bearer via the node.

46. An apparatus, comprising:
receiving means for receiving, in at least one node associated with an established data bearer configured to transport packet data for a user equipment, an instruction signal to prevent transportation of data to and from the user equipment using the data bearer via said at least one node during a communication connection establishment procedure; and controlling means for preventing transportation of packet data to and from the user equipment in response to the instruction signal until the communication connection establishment procedure has been completed;

wherein the controlling means for preventing transportation of the packet data to and from the user equipment in response to said instruction signal is configured for dropping at least some data packets that are transported by the data bearer via said at least one node in response to the instruction signal.

* * * * *